Oct. 27, 1931.  A. A. ZAJTMAN  1,829,698
WATCHMAKER'S MICROMETRIC GAUGE
Filed Feb. 10, 1928
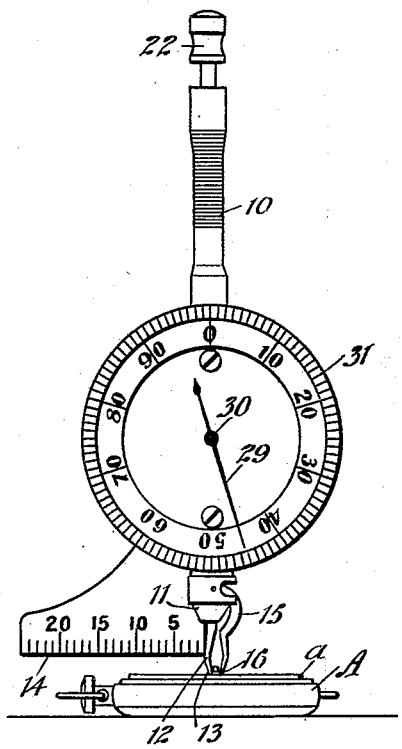
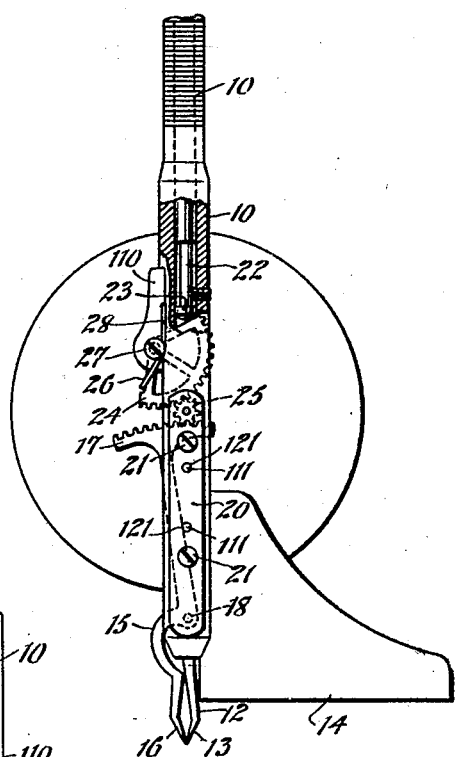
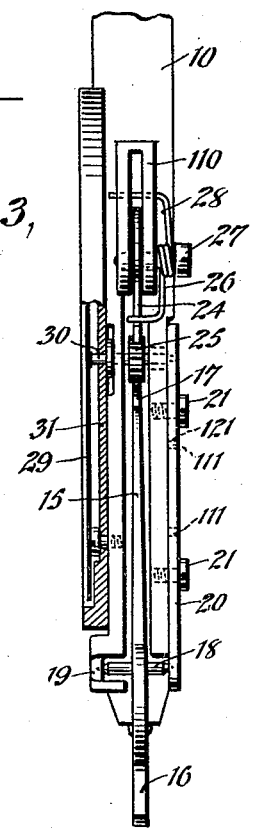
WITNESSES
INVENTOR
Alfred A. Zajtman
BY
ATTORNEY Patented Oct. 27, 1931

1,829,698

UNITED STATES PATENT OFFICE

ALFRED A. ZAJTMAN, OF NEW YORK, N. Y.

WATCHMAKER'S MICROMETRIC GAUGE

Application filed February 10, 1928. Serial No. 253,418.

My invention relates to a gauge which although useful as a gauge generally is more particularly designed for use in gauging the larger and smaller diameters of a watch arbor.

The general object of my invention is to provide an improved gauge whereby to accurately determine the size of the hole to be formed in a cannon pinion of a watch or the diameter of the hour wheel tube to conform precisely with the two diameters of the watch arbor.

Reference is to be had to the accompanying drawings forming part of this specification, it being understood that the drawings are merely illustrative of one example of the invention.

Figure 1 is a front elevation of a watchmakers' micrometric gauge embodying my invention;

Figure 2 is a rear elevation thereof with a part broken out and sectioned to show the operating plunger;

Figure 3 is an edge view of the lower portion of the gauge, the upper portion being omitted, and a part broken out and sectioned to show the indicating dial; and Figure 4 is a detail in elevation of the terminals of the gauge members showing the same in connection with a portion of an arbor and a part of a watch dial in section.

In carrying out my invention in practice in accordance with the illustrated example, the gauge is made with a standard 10 having a forked lower end 11 integral with which is a gauge member 12 having its terminal 13 angularly disposed.

The numeral 14 indicates a graduated gauge plate forming no particular part of the present invention. Coacting gauge element 15 is formed with an angularly disposed terminal end 16, the terminals 13, 16 being convergent.

On the upper end of element 15 is an arcuate rack 17 and said element 15 is pivoted by transverse pivot 18 centered at one end in the fixed member 19 at the lower end of the forked portion 11 of standard 10, and centered at its opposite end in a plate 20 detachably secured to one side of the forked portion 11 by screws 21. Pins 111 on the adjacent side of the forked portion 11 extend into pin holes 121 in plate 20 for properly positioning the plate 20 to receive the screws 21.

In the tubular upper portion of standard 10 operates a plunger 22 having at its lower end a head 23 adapted to be pressed down against a toothed sector 24 which turns an intermediate pinion 25 meshing with the arcuate rack 17 to rock the gauge element 15. The sector 24 is restored to normal position after movement by depression of plunger 22 by reason of a spring 26 coiled about the securing screw 27 of said sector, one arm 28 of the spring passing through bracket 110 integral with standard 10; it being apparent that the terminal 16 will be separated from the terminal 13 the maximum distance when the sector 24 is in its normal position.

A pointer 29 is provided on the shaft 30 of intermediate pinion 25 so that the pointer turns with the turning of said pinion and may be given movement over the face of an indicating dial 31.

In the use of the watchmakers' micrometric gauge formed as described, the convergent terminals 13, 16 of the gauge members 12, 15 are adapted to be entered through the bore A of a watch dial B to gauge the watch arbor C, which arbor has the usual reduced end $c$ to receive the usual cannon pinion of the watch, while the larger diameter of the arbor C receives the hour wheel tube. The plunger 22 is moved downwardly to rock the element 15, through the intervention of the rack 24, pinion 25 and rack 17, thereby causing the movement of the terminal 16 away from the terminal 13 to a position so that the arbor C may be inserted between the terminals. The spring 26 then urges the terminal 16 toward the terminal 13, causing both terminals to embrace the arbor C. In this way the pointer 29 will be given movement over the dial 31 commensurate with the distance that the terminal 16 is away from the terminal 13 whereby the smaller diameter $c$ and the larger diameter of the arbor C will be accurately gauged and indicated.

I would state furthermore that while the illustrated example constitutes a practical embodiment of my invention, I do not limit myself strictly to the exact details herein illustrated, since, manifestly, the same can be considerably varied without departure from the spirit of the invention as defined in the appended claims.

I claim:

1. A gauge of the class described, including a standard having a forked lower end and a centrally apertured upper end, a fixed gauge member mounted between the forks of said lower end and a pivoted gauge member pivotally mounted between said forks whereby the position of the same relative to the fixed member may be varied, a plunger axially movable in the upper end of said standard, a dial on said standard, a pointer on said standard movable in relation to the face of the dial, and means operated by the movement of the plunger to cause the pivotal movement of the pivoted gauge member and also to rotate said pointer.

2. A gauge of the class described, including a standard, a fixed gauge member on the lower end of said standard, a pivoted gauge member on said standard which is movable with respect to said fixed gauge member whereby the position of the former relative to the latter may be varied, an axially movable plunger in the upper end of the standard, means including a rotatable member on the standard to cause the pivotal movement of the pivoted gauge member in response to the axial movement of the plunger, a dial on the standard, and a pointer connected with said rotatable member and disposed to move in relation to the face of said dial.

Signed at New York, in the county of New York and State of New York, this 8th day of February, A. D. 1928.

ALFRED A. ZAJTMAN.